(12) United States Patent
Herron et al.

(10) Patent No.: US 6,791,904 B1
(45) Date of Patent: Sep. 14, 2004

(54) METHOD AND APPARATUS TO RECEIVE SELECTED AUDIO CONTENT

(75) Inventors: Matthew Allison Herron, Palo Alto, CA (US); Gabriel Manjarrez, Menlo Park, CA (US)

(73) Assignee: Outburst Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/981,347

(22) Filed: Oct. 15, 2001

(51) Int. Cl.[7] .................. G04B 47/02; G11B 31/00; H04B 1/00; H04M 3/42

(52) U.S. Cl. ............... 368/13; 369/19; 379/110.01; 379/209

(58) Field of Search .............. 368/13, 73; 369/19; 379/110.01, 93.25, 40–41, 51, 67.1, 198, 225, 209

(56) References Cited

U.S. PATENT DOCUMENTS

| | | | |
|---|---|---|---|
| 5,497,141 A | | 3/1996 | Coles et al. |
| 5,555,536 A | * | 9/1996 | Rolf et al. ............... 369/19 |
| 5,786,768 A | * | 7/1998 | Chan et al. ............. 340/632 |
| 5,802,158 A | * | 9/1998 | Jeong ..................... 379/198 |
| 5,812,653 A | * | 9/1998 | Jodoin et al. ......... 379/205.01 |
| 5,832,067 A | * | 11/1998 | Herold ............... 379/110.01 |
| 5,909,487 A | * | 6/1999 | Mainker ............. 379/209.01 |
| 5,991,373 A | * | 11/1999 | Pattison et al. ......... 379/93.17 |
| 6,212,268 B1 | * | 4/2001 | Nielsen .............. 379/210.01 |
| 6,229,430 B1 | * | 5/2001 | Smith Dewey ....... 340/286.02 |
| 6,373,374 B1 | * | 4/2002 | Siemens .............. 340/309.15 |
| 6,377,664 B2 | * | 4/2002 | Gerszberg et al. ....... 379/88.13 |
| 6,477,117 B1 | | 11/2002 | Narayanaswami et al. |
| 6,504,913 B1 | * | 1/2003 | Patterson et al. ........ 379/88.08 |

OTHER PUBLICATIONS

Christopher Barr and Michael Neubarth, "Pen Pals" vol. 12, No. 17, Oct. 12, 1993.

Gary Robinson & William Loveless, "Touch–Tone" Teletext, a Combined Teletext–Viewdata System IEEE Transactions on Consumer ELectronics, vol. CE–25, No. 3, Jul. 1979.

Tak W. Yan, K & Hector Garcia–Molina, "SIFT—A Tool for Wide–Area Information Dissemination" USENIX Technical Conference, New Orleans, Jan. 16–20, 1995.

Gabrielle Mitchell, "Freeloader, PointCast Network" PC World, Aug. 1996.

Gene Miller, Greg Baber & Mark Gilliland, "News On–Demand for Multimedia Networks" ACM Multimedia 93 /6/93/CA, USA 1993.

Jesse Berst, "'Push' Products Redefine Internet", PC Week, Nov. 25, 1996.

John Evan Frook, Interactive Age, 'News to the Desktop', www.techweb.cmp.com/ia/current Communications Week, Apr. 29, 1996.

(List continued on next page.)

Primary Examiner—David Martin
Assistant Examiner—Michael L. Lindinger
(74) Attorney, Agent, or Firm—Blakely Sokoloff Taylor & Zafman

(57) ABSTRACT

A method and apparatus to receive selected audio content. According to one embodiment of the invention, an audio playback system is described. The audio playback system includes an audio content server and a device. The audio content server includes audio content to be selected for playback. The device calls the audio content server to request and receive an audio playback of selected audio content at a scheduled time.

46 Claims, 3 Drawing Sheets

OTHER PUBLICATIONS

Ralph H. Baer, "Tele–Briefs, A Novel User–Selectable Real Time News Headline Service for Cable TV", IEEE Transactions on Consumer Electronics, vol. CE–25, No. 3, Jul. 1979.

Christopher Elliott, "Big Business at Businesswire.com", www.webtechniques.com, Dec. 1996.

George Avalos, "PointCast to Team with Microsoft, add new Net dimension", Contra Costa Times Business, Dec. 12, 1996.

Srinivas Ramanathan & P. Venkat Rangan, "Architectures for Personalized Multimedia", IEEE, 1994.

Srinivas Ramanathan, Harrick M. Vin & P. Venkat Rangan, Towards Personalized Multimedia Dial–Up Services, Computer Networks and ISDN Systems 26, pp. 1305–1322.

PED Software Corporation, "PRODIGY Interactive Personal Service, for a Window on a New World of News" Journalist, 1994.

* cited by examiner

METHOD AND APPARATUS TO RECEIVE SELECTED AUDIO CONTENT

BACKGROUND OF THE INVENTION

1. Field of the Invention

The invention relates to the field of computing. More specifically, the invention relates to the scheduled delivery of selected audio content.

2. Background of the Invention

Traditionally, to be awaken at a scheduled time one would utilize a telephone wake-up call service or more commonly a standard clock-radio. A wake-up call service operates by telephoning a subscriber at a specified time and place. Typically, a subscriber requests the wake-up call service provider, by telephone, to be awakened by a telephone call at a specific time and at a specific telephone number. The request may be made to a live operator or an automatic telephone system. Then, at the specific time, the live operator or automated phone system calls the specific telephone number to awaken the subscriber. At times, the wake-up call comprises an announcement through the telephone receiver stating "This is your wake-up call."

The well know clock-radio operates by allowing one to physically interact with the clock-radio in order to configure the clock-radio settings, such as, to set a time for the clock-radio to emit an audio alarm (e.g., buzzer) or to switch on the radio to a preset radio frequency. The clock-radio has the benefit of awakening one to the sound of music, weather and traffic updates, or possibly various types of news depending on the programming of the preset radio station.

BRIEF SUMMARY OF THE INVENTION

A method and apparatus to receive selected audio content is described. According to one embodiment of the invention, an audio playback system is described. The audio playback system includes an audio content server and a device. The audio content server includes audio content to be selected for playback. The device calls the audio content server to request and receive an audio playback of selected audio content at a scheduled time.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

A method and apparatus to receive selected audio content is described. Specifically, the invention allows for selected audio content to be acquired by a device (e.g., a clock-radio, among other examples) at a scheduled time. Here, the device includes a microphone from which a subscriber selects categories of audio content to be delivered from an audio content service provider. The categories of audio content to be selected from include a wide variety of audio content (e.g., news, sports, travel, etc.) as will be described. The audio content service provider delivers an audio playback of the selected audio content to the audio output speaker of the device at a specific time without human intervention as will be further described. For example, the device may be a clock-radio device from which a subscriber is awakened with an audio playback of the selected audio content, at a specific time, rather than receiving unsolicited information provided by a particular radio station program.

Figure 1:
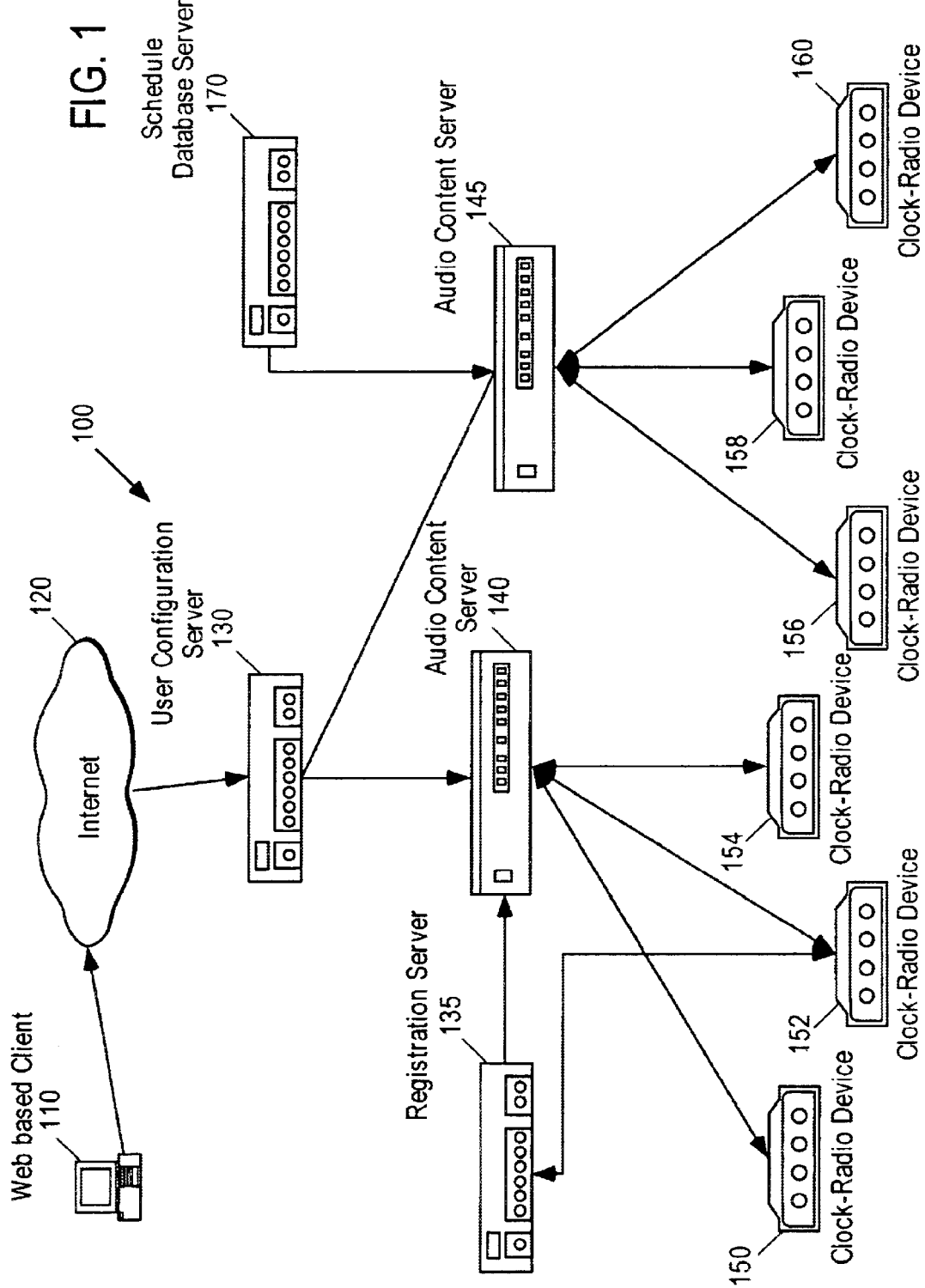
FIG. 1 illustrates a manner in which selected audio content is transmitted to a clock-radio device according to one embodiment.

FIG. 1 illustrates a manner in which selected audio content Is transmitted to a clock-radio device according to one embodiment. Here, in the network environment 100, clock-radio devices 150, 152, 154, 156, 158, and 160 receive selected audio content from either of the audio content servers 140 or 145. Each clock-radio device 152 includes a telephone jack (e.g., RJ-11, RJ-14, RJ-47, etc) that provides connectivity to a telephone network (both public and private). In this way, a subscriber chooses selected audio content over the plain old telephone system (POTS) from the clock-radio device 152 and/or from a web based client 110 connected to a user configuration server 130 through the Internet 120 as will be further described below.

Figure 2:
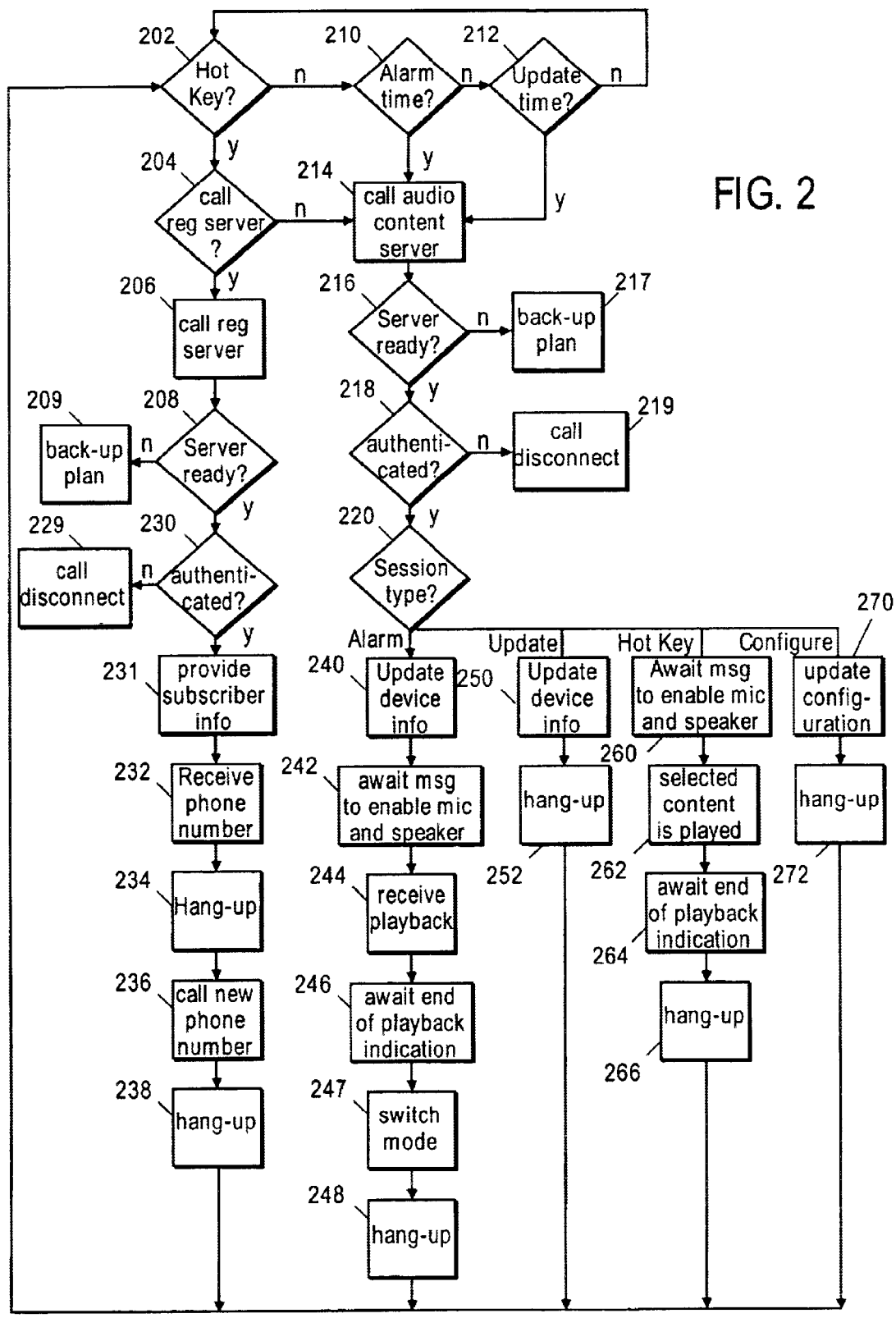
FIG. 2 is a flow diagram illustrating a flow in which a clock-radio device operates according to one embodiment.

FIG. 2 is a flow diagram illustrating a flow in which a clock-radio device operates according to one embodiment. The following description illustrates the manner in which selected audio content is transmitted to clock-radio device 152 with reference to FIGS. 1 and 2, according to one embodiment.

At block 202, if a 'hot key', on the clock-radio device 152, is selected to initiate a call from the clock-radio device 152, control passes to block 204.

At block 204, if the call is to audio content server 140, then control passes to block 214. If the call is to registration server 135, then control passes to block 206. In one embodiment, each unregistered clock-radio device has stored a default phone number to the registration server 135. Here, the initial server to call is determined by this default phone number stored in the clock-radio device 152. The phone number stored the clock-radio device is preferably a '800' phone number so that the clock-radio device 152 may connect from any area code without added expense to the subscriber.

At block 206, the clock-radio device 152 initiates a phone call to registration server 135, then control passes to block 208. The registration server 135 provides an initial set-up for the clock-radio device 152 and collects subscriber information.

At block 208, a determination is made as to whether the registration server is ready. For example, a DTMF tone response from the registration server 135 may indicate that the registration server 135 is ready. If the registration server 135 is ready, then control passes to block 230. If the registration server 135 is not ready, then control passes to block 209. At block 209, as a back-up plan, a number of actions may be performed. A back-up plan may include, for example, the clock-radio device 152 notifying the subscriber that the registration server 135 is not ready, the clock-radio device 152 being redirected to a different registration server, the clock-radio device 152 being reset to call the registration server 135 at a later time, among other examples.

At block 230, the clock-radio device 152 transmits authentication information to registration server 135. If the registration server 135 authenticates the specific clock-radio device 152, then control passes to block 231. In one embodiment, a unique serial number is assigned to each clock-radio device 150, 152, 154, 156, 158, and 160. It is from this unique serial number that the registration server 135 will authenticate the initial call from the clock-radio device 152. If ,the registration server fails to authenticate the specific clock-radio device 152, then control passes to block 229. At block 229, the call is disconnected from the registration server 135.

In block 231, upon authentication, the clock-radio device 152 provides the registration server 135 with subscriber information, then control passes to block 232. In one embodiment, the subscriber information includes personal information, billing information, among others for example. The subscriber provides this information by menu driven interactive voice instructions through the microphone in the clock-radio device 152 to the registration server 135. Here, the registration server 135 includes a voice recognition mechanism, that are well known in the art, to interpret and store the subscriber information. In one embodiment, the registration server 135 will transfer a copy of the subscriber information to the user configuration sever 130. The user configuration server 130 manages a repository of subscriber information for each subscriber.

In block 232, the clock-radio device 152, is assigned a phone number of a specific audio content service provider, then control passes to block 234. An audio content provider supplies a playback of selected audio content to the audio output speaker of a clock-radio device. Here, the audio content server 140 will become the specific audio content service provider from which clock-radio device 152 will retrieve selected audio content. This phone number is stored in the clock-radio device 152 and will be the phone number the clock-radio device 152 calls to interact with the services provided by the audio content server 140, as will be further explained below. It should be appreciated that, having the clock-radio devices 150–160 connect with multiple audio content servers 140–145, may be advantageous to load balance the selected audio content playback to clock-radio devices. In one embodiment, the clock-radio device 152 continues to store the default phone number in case the assigned phone number fails to connect.

At block 234, the clock-radio device 152 terminates its connection with the registration server 135, then control passes to block 236. In one embodiment, upon retrieving the phone number of the default audio content server 140 and providing subscriber information to the audio content server 140, the clock-radio device 152 receives an indication from the registration server 135 to terminate the connection. This indication transmitted by the registration server 135 may be initiated by the subscriber selecting to exit from the menu driven interactive voice menu.

At block 236, the clock-radio device 152 automatically places a new phone call to the audio content server 140, then control passes to block 238. The audio content server 140 is the conduit from which selected audio content is provided to the clock-radio device 152 by an audio content service provider. In one embodiment, the subscriber selects audio content from the audio content server 140 via menu driven interactive voice instructions. For example, upon connecting to audio content server 140, the subscriber listens to a menu of options, such as, update personal information, update billing information, select audio content, set clock-radio settings, among other examples to be described below. Here, the subscriber may choose to update the selected audio content. Then, a choice of audio content is presented for the subscriber to choose from.

The audio content categories to be selected may be broad in scope, such as, political news, financial news, entertainment news etc., or may also be narrow in scope, such as, stock news of a specific company, sports news of a specific team, local traffic and weather, etc. In one embodiment, the subscriber provides commute information, such as street names of a commuter route, such that the subscriber may then receive an audio playback of the traffic conditions for that specific route.

At block 238, the clock-radio device 152 terminates its connection with the audio content server 140. Here, upon choosing the categories of selected audio content from the audio content server 140, the audio content server 140 transmits an indication to the clock-radio device 152 to terminate the connection. The indication transmitted by the audio content server 140 may be initiated by the subscriber selecting to exit from the menu driven interactive voice system or after a specific time period has lapsed with the audio content server 140 receiving no voice instruction from the subscriber. The clock-radio device 152 then awaits another action to initiate a call to the audio content server 140.

In one embodiment, once the audio content to be played has been selected, a subscriber schedules a time on the clock-radio device 152 to receive the selected audio content from the audio content server 140. In one embodiment, the subscriber uses a tactile console (e.g., buttons, levers, dials, etc.) on the clock-radio device 152 to schedule a time, similar to how a traditional clock-radio alarm is set to switch-on the radio at a specific time. However, here, the subscriber sets the clock-radio device 152 to playback the selected audio content at a specific time.

The subscriber may also direct the clock-radio device 152 to perform other functions, such as, to snooze, set volume, shutoff the selected audio content audio playback, set radio frequency, set the clock time, set the alarm to radio, set the 'buzzer' alarm, set alarm to stop, among other examples. In addition, the clock-radio device 152 includes a digital display used to passively display infornation, such as, time, modes, radio frequencies, alarm times, among others for example. The clock-radio device 152 may also include 'content controls', as will be further described below.

Continuing at block 210, if the scheduled playback time is reached control passes to block 214. At block 214, a call is made to the audio content server 140, then control passes to block 216. Here, the clock-radio device 152 connects with the audio content server 140. At block 216, if the audio content server 140 is ready then control passes to block 218, else block 217.

At block 217, if the audio content server 140 is not ready (e.g., no DTMF tone acknowledgment is received from the audio content server 140), the clock-radio device 152 may initiate an alternative wake-up (e.g., 'buzzer' alarm, switch-on radio), inform the subscriber of the failure, and/or call the registration server 135 to debug or receive a new audio content server number.

At block 218, the clock-radio device 152 transmits authentication information to audio content server 140. If the audio content server 140 authenticates the specific clock-radio device 152, then control passes to block 220.

Here the request may be authenticated with subscriber authentication data. Subscriber authentication data may include the telephone number the clock-radio device 152 is calling from via caller ID, a unique clock-radio device identifier, other types of audio band or caller ID band information transfer, etc. The subscriber authentication data may differ or be the same as the authentication data used by the subscriber to access the registration server 135. If the audio content server 140 fails to authenticate the specific clock-radio device 152, then control passes to block 219. At block 219, the call is disconnected from the audio content server 140.

At block 220, the clock-radio device 152 is authenticated and specifies an 'Alarm' type of session to be initiated with the audio content server 140, then control passes to block 240. At block 240, the clock-radio device 152 receives any necessary clock-radio settings, then control passes control to block 242. The clock-radio settings are the configuration settings of the clock-radio device, such as, an assigned audio content server phone number, a default registration server phone number, a clock time, an alarm time, a radio frequency preset, wake-up options, (e.g., buzzer, radio, etc), update time, update timestamp, etc. The update time allows for setting the time in which a clock-radio device calls the audio content server for updated clock-radio settings, as will be further described below. The update timestamp provides the time the alarm time was last set. This information may be used to indicate whether the alarm time on the clock-radio device or audio content server should be used when a conflict occurs, as will be, further described below. The clock-radio settings are to be stored in the clock-radio device 152.

At block 242, after receiving any necessary clock-radio settings, the clock-radio device 152 awaits a request by the audio content server 140 for clock-radio device 152 to enable its audio output speaker(s) and its microphone, then control passes to block 244. In one embodiment, the microphone is coupled with the audio of the phone call, therefore, it is preferable to have the microphone disabled while data is being exchanged. That is, any time data is transmitted, the speaker and microphone are disabled, while any time audio is transmitted, the speaker and microphone are enabled. In addition, it should be appreciated that by disabling the speaker during the data transmission, the subscriber does not hear, the sometimes annoying, DTMF tone exchange of data with the audio content server.

At block 244, the clock-radio device 152 receives the playback of the selected audio content from the audio content server 140, then control passes to block 246. At block 246, the clock-radio device 152 awaits an indication of the end of the audio playback. In one embodiment, the audio content server 140 plays the audio playback directly over the audio output speaker of the clock-radio device 152. This avoids having to receive, store, and uncompress an entire audio file to the clock-radio device 152 as if it were to be transferred digitally. Thereby, in one embodiment, the clock-radio device 152 will not require any disk space to store an audio file nor require internal logic to decrypt, uncompress, or play the audio file.

At block 247, upon reaching the end of the audio playback (e.g., the clock-radio device 152 receives a DTMF tone from the audio content server 140), the clock-radio device 152 is automatically switched to another mode (e.g., switch on radio station, Buzzer, etc.), then control passes to block 248. For example, after the audio playback of the selected audio content is played, the clock-radio device 152 may automatically switch on the radio to a preset radio frequency. At block 248, the clock-radio device 152 terminates the connection to the audio content server 140, then awaits another action to initiate a call to the audio content server 140.

Continuing from block 212, if the clock-radio device 152 determines it is time to check for updated dock-radio settings, then control passes to blocks 214, 216, and 217 as described above. In this way, the clock-radio device 152, at a specific time (e.g., update time), calls the audio content server 140 to determine if any necessary clock-radio settings are available to be stored on the clock-radio device 152. For example, the audio content server 140 may contain a new alarm time for the clock-radio device 152. The clock-radio device 152 periodically calls the audio content server 140 at preset times to determine whether such clock-radio settings are available, then retrieves and stores the clock-radio settings on the clock-radio device 150. If the alarm time on the clock-radio device 150 and audio content server 140 do not match, then the alarm time with the latest update timestamp is stored on the clock-radio device 152.

In one embodiment, the update time may automatically be deviated by some random amount to accomplish more efficient load balancing. For example, if the clock-radio device 152 has an initial update time of 5 am, the audio content server 140 may have deviated this time to 4:55 am, during a previous update type session, to lessen the load on the audio content server 140 at 5 am.

At block 220, the clock-radio device 152 specifies a 'Update' type session to be initiated with the audio content server 140, then control passes to block 250. As stated above, the clock-radio settings are to be stored in the clock-radio device 152. At block 250, the clock-radio device 152 is provided any necessary dock-radio settings as described above, then control passes to block 252. At block 252, the clock-radio device 152 terminates the connection to the audio content server 140, then awaits another action to initiate a call to the audio content server 140. In one embodiment, the microphone and speaker is disabled during this entire session as not to disturb the subscriber with any sounds.

Continuing from block 202, if a 'hot key' was selected in block 202 and a call is not initiated with the registration server 135 at block 204, then control passes to block 214, 216, and 218 as described above. As stated, the clock-radio device 152 may include content controls. Here, instead of a subscriber scheduling the clock-radio device 152 to receive an audio playback at a specific time, the content controls allow a subscriber to immediately request specific audio content to be played from the audio content server 140. For example, upon the subscriber pressing a 'News' content control button on the clock-radio device 152, a call is made to the audio content server 140 and selected 'News' audio content is played back over the audio output speaker of the clock-radio device 152. If an audio playback is currently playing when a subscriber presses any of the content controls, then the playing audio playback is interrupted with the new audio playback selected by the specific content control.

Examples of content controls on the clock-radio device 152 include buttons, such as, Traffic, News, Weather, My Key, and Interactive Controls, among other examples. Here, the Traffic button Initiates the audio playback of current traffic information for the route or area selected by the subscriber. The News button initiates the audio playback of News (e.g., financial, sports, technology, etc.,) selected by the subscriber. The Weather button initiates the audio playback of weather for a single or multiple city/region selected by the subscriber. The My Key button may initiate the audio playback of select information selected by the subscriber (e.g., entertainment, jokes, horoscope, etc.,). The Interactive Controls may include a set of keys to be used to answer questions interactively. For example, the interactive controls may include four buttons labeled 'A', 'B', 'C', and 'D'. These buttons may be used to answer riddles, quizzes, vote, or make selections during the playback of audio content.

In an alternative embodiment, a voice control button on the clock-radio device 152 is used to initiate a generic interactive session where a call is made to the audio content server and a subscriber uses menu driven voice instructions to select audio content to playback immediately or to update subscriber information as described below. For example, upon pressing the 'Voice Control' button on the clock-radio device 152, a call is made to the audio content server 140. Then,.by interacting with a menu driven interactive voice system the subscriber may request specific audio content to be played over the audio output speaker on the clock-radio device 152 or provide update subscriber information.

At block 220, the clock-radio device 152 specifies a 'hot key' type session to be initiated with the audio content server 140, then control passes to block 260. At block 260, upon transmitting a 'hot key' request, the clock-radio device 152 awaits a request from the audio content server to enable the microphone and audio output speaker as described above, then control passes to block 262. At block 262, the selected audio content requested is played over the audio output speaker, then control passes to block 264. At block 264, the clock-radio device awaits an indication that the playback of the selected audio content has ended as described above, then control passes to block 266. At block 266, the clock-radio device 152 terminates the connection to the audio content server 140.

At block 220, if a hot key is selected and the clock-radio device 152 specifies a 'Configure' type of session to be initiated with the audio content server 140, then control passes to block 270. At block 270, the subscriber may use menu driven interactive voice instructions to update subscriber information (e.g., update clock-radio settings, update categories of audio content for playback, etc), as described above. Again, pressing the hot key interrupts any current audio playback being performed (e.g., at block 244, 262, etc.). At block 272, the clock-radio device 152 awaits an indication that the audio playback has ended, then terminates the connection to the audio content server 140.

In one embodiment, a subscriber connects to a user configuration server 130 to select from among various audio content to be played over the audio output speaker of clock-radio device 152 and also to update subscriber information. The user configuration server 130 manages a repository of subscriber information for each subscriber. As stated above, the subscriber information may include personal information, billing information, authentication information, audio content selections, clock-radio settings, among other examples.

A subscriber may access the user configuration server 130 from a web based client 110 (e.g., web browser) with a web based protocol through the Internet 120 and be presented with specific subscriber information displayed on a web page. The subscriber may then modify this subscriber information, as needed. In alternative embodiments, the subscriber may connect with other protocols, such as, through a direct point-to-point protocol, an email protocol, etc.

In one embodiment, a subscriber is authenticated before gaining access to, the user configuration server 130. Authentication may include the subscriber, manually or automatically, providing a password, a cookie, or an IP address, among other examples, to the user configuration server 130. For example, the subscriber may be required to supply a subscriber name and password to access the user configuration server 130. Upon proper authentication, the subscriber gains access to the user configuration server 130. Here, the subscriber authentication data may differ or be the same as the authentication data used by the subscriber to access the audio content server 130.

For example, via the web based client 110 connection to the user configuration server 130, the subscriber may select from the audio content selections as presented by check boxes, list boxes, radio buttons, or a text entry on the audio content selection entries of the web page. The audio content selection web page may also provide for the update of additional subscriber information, such as, clock-radio settings, an audio preview option, audio content category search engine, an option to set the order that each selected audio content will playback to the clock-radio device 152. Upon making the selections, in one embodiment, the user configuration server 130 transfers the selected audio content to the audio content server 140 along with any updated clock-radio settings. The clock-radio device 152 will then automatically receive the selected audio content and/or clock-radio settings upon the next request.

Although the selected audio content has been described as being scheduled, transmitted to, and played over a clock-radio device, in alternative embodiments, the audio playback may be played over other audio devices, such as, a mobile cell phone, among other examples.

In one embodiment, a schedule database server 170 contains a repository of subscriber calendar information for each subscriber. The subscriber calendar information includes dates and times of meetings, reminders, appointments, anniversaries, birthdays, events, among other examples. A subscriber may use the schedule database server 170 to manage work and personal schedules. Here, the subscriber populates the schedule database server 170 with specific subscriber calendar information. For example, the subscriber may populate the schedule database server 170 with calendar information stored in a personal digital assistant (PDA). The subscriber may update the subscriber calendar information stored in the schedule database server 170 in a manner similar to those described above to access and update the subscriber information from a clock-radio device or web-based client.

Upon populating the schedule database server 170, the subscriber calendar information is transferred and stored on the audio content server 145. The subscriber may then schedule a time for an audio playback of the scheduling information to be transmitted to the audio output speaker(s) of a clock-radio device. In this way, the subscriber may schedule alarm times and listen to various times of meetings, events, etc., for the day, week, month, among other time periods.

In one embodiment, the audio content service provider also includes audio advertisement information with the selected audio content. Here, the audio content server may provide general or directly marketed advertisement. Here, the directly marketed advertisement may be similar to the category of selected audio content provided. For example, if the subscriber selects to have financial news audio content played, then financial advertisements may be automatically included with the selected financial audio content by the audio content service provider.

Figure 3:
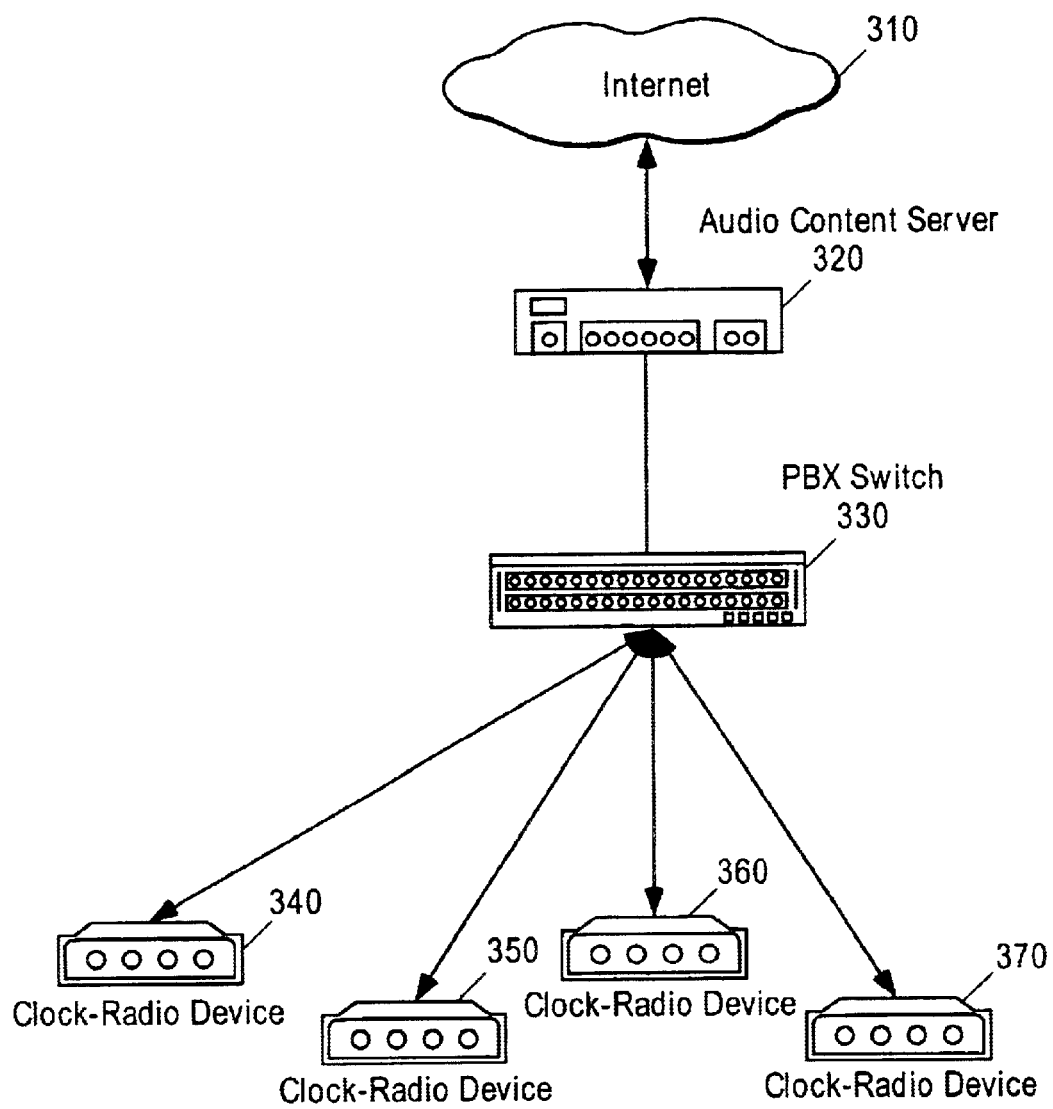
FIG. 3 illustrates a manner in which selected audio content is transmitted to a clock-radio device through a PBX switch according to one embodiment.

FIG. 3 illustrates a manner in which selected audio content is played over a clock-radio device through a PBX switch according to one embodiment. A PBX (private branch exchange) switch manages a telephone system within a local entity that allows all entity users to share a certain number of phone lines external to the entity. For example, a hotel may use a PBX switch to manage phone calls between each hotel room and phone calls to the external public telephone network. The PBX switch may be present on the site of the entity and may be manually operated from a main switchboard and/or automatically with little human intervention. To continue the example, a hotel guest may make a phone call directly (externally or to other rooms) or ask the front desk operator to make the connection from the hotel switchboard (e.g., PBX switch). In this way, the telephone lines for each hotel room share a certain number of external phone lines managed by the PBX.

In FIG. 3, clock-radio devices 340–370 are connected to a PBX switch 330 which provides access to the audio content server 320 to the Internet 310. To continue the example, the hotel guest using the clock-radio device 350 may select the audio content to be awakened to by various methods, as described above, including from the clock-radio device 350. Hotel personnel may also select specific content to be played to the hotel guest such as, conference times, breakfast time, check-out time, interactive language preferences, flight times, concierge information, hotel services, among other examples. A hotel guest may also schedule the time for the audio playback of the selected audio content to the clock-radio device 350 as described above.

At the scheduled time, the clock-radio device 350 dials the audio content server 320 through the PBX switch 330. The audio content server 320 may be located within the entity or accessible over the public telephone network outside the entity. In either case, by communicating through the PBX switch the hotel is saved the cost of requiring a direct phone line from each clock-radio device to the external public telephone network. The audio content server 320 may then transmit the audio playback over the output speaker(s) of the clock-radio device 350.

It should be understood that although the invention has been described as including an audio content server, a user configuration server, and a schedule database server, in alternative embodiments, the functionality described for each of these servers may be within one or more servers without limiting the scope of the invention.

In alternative embodiments, the connection between the clock-radio device 152 and the audio content server 140 may be over a cellular phone line or any analog delivery systems, among other examples. In one embodiment, the clock-radio device 152 may include one or more of an internal modem card port (e.g., fax/modem, cable modem, cellular modem, wireless modem, etc.), Ethernet card port, wireless antenna, etc., from which the clock-radio device 152 may convert a playback from digital to audio on the fly if necessary.

It should also be appreciated that the clock-radio device 152 initiates the call to the audio content server 140, plays the selected audio content, and receives/stores clock-radio settings from the audio content server 140 without direct human intervention. At least for these reasons, the network environment 100 differs from other conventional prior art environments where a repository of audio content is accessed by a person making a phone call and interactively selects and immediately receives audio content over the phone. Therefore, one advantage of the clock-radio device operating as described is that it allows for the selected audio content to be played automatically at the scheduled time without being immediately initiated by a human, thereby, allowing for one sleeping to be awakened. In addition, allowing the clock-radio device to receive clock-radio settings from the audio content server, provides the advantage of configuring the clock-radio device from a remote location (e.g., to reschedule the alarm time). Neither of these advantages may be performed by any of the conventional audio content servers in the prior art.

Some portions of the detailed description have been presented in terms of algorithms and symbolic representations of operations on data bits within a device memory. These algorithmic descriptions and representations are the means used by those skilled in the art to most effectively convey the substance of their work to others skilled in the art. An algorithm as described here is generally conceived to be a self consistent sequence of acts or operations leading to a desired result. The acts are those requiring physical manipulations of physical quantities. Usually, though not necessarily, these quantities take the form of electrical or magnetic signals capable of being stored, transferred, combined, compared and otherwise manipulated. It has proven convenient at times principally for reasons of common usage to refer to these signals as bits, values, elements, symbols, characters, terms, numbers, data or the like.

It should be borne in mind, however, that all of these in similar terms are to be associated with the appropriate physical quantities and are merely convenient labels applied to these quantities. Unless specifically stated otherwise as apparent from the following discussion it is appreciated that throughout the description discussions utilizing terms such as "processing" or "computing" or "calculating" or "determining" or "displaying" or the like refer to the action and processes of a computer system or similar electronic computing device that manipulates and transforms data represented as physical (electronic) quantities within the computer systems registers and memories into other data similarly represented as physical quantities within the computer system memories or registers or other such information storage transmission or display devices. The present invention can be implemented by an apparatus for performing the operations herein. This apparatus may be specially constructed for the required purposes or it may comprise a machine such as a general purpose computer selectively activated or reconfigured by a computer program (such as a collection of instructions for execution by a machine or processor for example) stored in the computer. Such a computer program may be stored in a computer readable storage medium such as but not limited to any type of disk including floppy disks, optical disks, CD roms and magnetic optical disks, read only memories, random access memories, EPROMS, EEPROMS, magnetic or optical cards or any type of media suitable for storing electronic constructions and each coupled to a computer system bus. Each of these media may be coupled to a computer system bus through use of an appropriate device for reading and or writing the media in question. Specialty apparatus may include a collection of readily available pieces or an application specific integrated circuit including a series of logic blocks for example. Some blocks in one or more figures may be suitable for implementation as logic blocks, as may other configurations of the method, system and apparatus described herein.

The algorithms and displays presented herein are not inherently related to any particular computer or other apparatus. Various general purpose systems may be used with programs in accordance with the teachings herein or it may prove convenient to construct more specialized apparatus to perform the required method. For example, any of the methods according to the present invention can be implemented in hard wired circuitry by programming a general purpose processor or by any combination of hardware and software. One of skill in the art will immediately appreciate that the invention can be practiced with computer system configuration. Configurations other than those described below including hand held devices, multi processor systems, microprocessor based or programmable consumer electronics, network PCs, mini computers, main frame computers and the like. The invention may also be practiced in distributed computing environments or tasks or performed by remote processing devices that are linked through a communications network. The required structure for a variety of these systems will appear from the description below.

The methods of the invention may be implemented using computer software. If written in a programming language conforming to a recognized standard sequences of instructions designed to implement the methods can be compiled for execution on a variety of hardware platforms or machines and for interface to a variety of operating systems. In addition the present invention is not described with reference to any particular programming language. It will be appreciated that a variety of programming languages may be used to implement the teachings of invention as described herein. Furthermore, it is common in the art to speak of software in one form or another (for example program procedure application etc.) as taken in action or causing a result. Such expressions are merely a shorthand way of saying that execution of the co software by a computer causes the processor of the computer to perform an action or produce a result.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A audio playback system comprising:
   a network;
   an audio content server, said audio content server includes audio content to be selected for playback, the audio content server coupled to said network;
   a device, said device to call said audio content server over said network to request and receive an audio playback of the selected audio content at a scheduled time; and
   a registration server, said registration server includes a set of one or more phone numbers of said audio content server, said device to call said registration server over said network to receive one of said phone numbers of said audio content server, said registration server to store said one of said phone numbers of said audio content server in a memory of said device.

2. The audio playback system of claim 1, wherein said device is a clock-radio device.

3. The audio playback system of claim 1, wherein said device uses said one of said phone numbers of said audio content server to call said audio content server to request and receive said selected audio content.

4. The audio playback system of claim 1, wherein said device is to provide authentication information prior to accessing said registration server.

5. The audio playback system of claim 1, wherein said device includes a tactile console to schedule a time to play said selected audio content over said audio output speaker.

6. The audio playback system of claim 1, wherein the audio playback includes audio advertising information.

7. The audio playback system of claim 1, where said device includes a memory, said memory to store one or more device settings.

8. The audio playback system of claim 7, wherein said device settings to be received from said audio content server.

9. The audio playback system of claim 7, wherein said device settings includes at least one selected from the group consisting of a phone number of said audio content server, an alarm time, an update timestamp, a radio frequency, and a wake-up option.

10. An audio playback system comprising:
    a network;
    an audio content server, said audio content server includes audio content to be selected for playback, the audio content server is coupled to the network;
    a user configuration server, said user configuration server to include a selection of audio content on the audio content server, the user configuration server is coupled to the network;
    a device, said device to call said audio content server to request and receive an audio playback of the selected audio content at a schedule time, the device is coupled to the network; and
    a web based browser, said web based browser to access said user configuration server via the network to select audio content to be played over said device.

11. The audio playback system of claim 10, wherein said device is to provide authentication information to said audio content server prior to accessing said audio content server.

12. The audio playback system of claim 10, wherein said device includes a microphone, said microphone to select said selected audio content on said audio content server with interactive voice instructions, said microphone to provide subscriber information to said audio content server.

13. The audio playback system of claim 10, wherein said web based browser is to access said user configuration server to update subscriber information.

14. The audio playback system of claim 10, wherein said web based browser is to provide authentication information prior to accessing said user configuration server.

15. An audio playback system comprising:
    a network;
    an audio content server, said audio content server includes audio content to be selected for playback;
    a schedule database server, said schedule database server to include subscriber calendar information; and
    a device, said device to call said audio content server to request and receive an audio playback of the selected audio content and the subscriber calendar information at a scheduled time.

16. A method to play selected audio content comprising:
    accessing a registration server;
    retrieving from said registration server a phone number of an audio content server;
    storing said phone number in a memory;
    accessing the audio content server with said phone number to select audio content to be provided via an audio playback over an audio output speaker;
    scheduling a time to send a request to said audio content server for said audio playback of said selected audio content;
    sending said request to receive said audio playback from said audio content server at said scheduled time; and playing the audio playback of the selected audio content over said audio output speaker.

17. The method of claim 16, wherein said selecting audio content includes to use interactive voice instructions to select said audio content.

18. The method of claim 17, wherein said interactive voice instructions are to be made over a microphone.

19. The method of claim 16, wherein said selecting audio content includes to use a web based client to select said audio content.

20. The method of claim 16 further comprising:
sending authentication information to said registration server to access said registration server.

21. The method of claim 16, wherein said sending includes sending authentication data to said audio content server.

22. The method of claim 16, wherein said selected audio content includes at least one selected from the group consisting of traffic information, news information, weather information, financial information, entertainment information, business information, schedule information, and sports information.

23. The method of claim 16, wherein said sending includes sending subscriber information to be updated on said audio content server.

24. The method of claim 16, wherein said scheduling includes scheduling an alarm on a clock-radio device.

25. The method of claim 16, wherein the audio playback includes audio advertising information.

26. An apparatus to receive selected audio content comprising:
a transmitter unit, said transmitter unit to make a request to an audio content server for audio content, and further said transmitter unit to call a registration server, said registration server includes a set of one or more phone numbers of said audio content server;
a receiver unit, said receiver unit to receive an audio playback of selected audio content, and further said receiver unit to receive one of said phone numbers from said registration server, and said receiver unit to store one of said phone numbers in a memory, said transmitter unit being coupled to said receiver unit; and
an audio output speaker, said audio output speaker to output said audio playback of said selected audio content, said audio output speaker being coupled to said receiver unit.

27. The apparatus of claim 26, wherein said request is for an audio playback of said selected audio content, said audio playback to be directed to said audio output speaker.

28. The apparatus of claim 26 further comprising:
a scheduler unit, said scheduler unit to schedule a time when said transmitter unit is to make said request, said scheduler unit being coupled to said transmitter unit.

29. The apparatus of claim 26, wherein said request to include authentication information from which said transmitter unit is to use to access said audio content server.

30. An apparatus to receive selected audio content comprising:
a transmitter unit, said transmitter unit is to select audio content from a user configuration server, and further said transmitter unit to make a request to an audio content server for selected audio content;
a receiver unit, said receiver unit to receive an audio playback of the selected audio content requested by said transmitter unit, said transmitter unit being coupled to said receiver unit; and
an audio output speaker, said audio output speaker to output said audio playback of said selected audio content, said audio output speaker being coupled to said receiver unit.

31. An apparatus to receive selected audio content comprising:
a transmitter unit, said transmitter unit to provide subscriber information to a user configuration server, said user configuration server to store said subscriber information, and further said transmitter unit to make a request to an audio content server for selected audio content;
a receiver unit, said receiver unit to receive an audio playback of the selected audio content requested by said transmitter unit, said receiver unit being coupled with said transmitter unit; and
an audio output speaker, said audio output speaker to output said audio playback of said selected audio content, said audio output speaker being coupled with said receiver unit.

32. The apparatus of claim 31, wherein said transmitter unit includes a microphone from where a subscriber may make said request.

33. The apparatus of claim 31, wherein said subscriber is to use said microphone to interact with said audio content server to select said selected audio content.

34. The apparatus of claim 31, wherein said request include subscriber information to be updated on said audio content server.

35. The apparatus of claim 31, wherein the audio playback includes audio advertising information.

36. The apparatus of claim 31 further comprising:
a memory, said memory to store one or more settings of said apparatus, said one or more settings to be received from said audio content server.

37. A machine-readable medium having instructions to cause a machine to perform a method, the method comprising:
accessing a registration server;
retrieving from said registration server a phone number of a audio content server,
storing said phone number in a memory;
accessing the audio content server with said phone number to select audio content to be provided via an audio playback over an audio output speaker;
scheduling a time to send a request to said audio content server for said audio playback of said selected audio content;
sending said request to receive said audio playback from said audio content server at said scheduled time; and
playing the audio playback of the selected audio content over said audio output speaker.

38. The machine-readable medium of claim 37, wherein said selecting audio content comprises using interactive voice instructions to select said audio content.

39. The machine-readable medium of claim 38 where said interactive voice instructions are to be made over a microphone when selecting audio content.

40. The machine-readable medium of claim 38, where said selecting audio content includes using a web based client to select said audio content.

41. The machine-readable medium of claim 37, further comprising:
sending authentication information to said registration server to access said registration server.

42. The machine-readable medium of claim 37, wherein said sending includes sending authentication data to said audio content server.

43. The machine-readable medium of claim 37, wherein said selected audio content includes at least one selected from the group consisting of traffic information, news information, weather information, financial information, entertainment information, business information, schedule information, and sports information when selecting audio content.

44. The machine-readable medium of claim 37, wherein said sending includes sending subscriber information to be updated on said audio content server.

45. The machine-readable medium of claim 37, wherein said scheduling comprises scheduling an alarm on a clock-radio device.

46. The machine-readable medium of claim 37, wherein the audio playback comprises receiving audio advertising information.

* * * * *